United States Patent
Fagan et al.

(10) Patent No.: US 7,346,036 B2
(45) Date of Patent: Mar. 18, 2008

(54) ROUTE SERVER MONITOR

(75) Inventors: C. L. Fagan, Bellevue, WA (US); Tri M. Phan, Renton, WA (US)

(73) Assignee: The Boeing Company, Chicago, IL (US)

( * ) Notice: Subject to any disclaimer, the term of this patent is extended or adjusted under 35 U.S.C. 154(b) by 577 days.

(21) Appl. No.: 10/980,558

(22) Filed: Nov. 3, 2004

(65) Prior Publication Data

US 2005/0220053 A1    Oct. 6, 2005

Related U.S. Application Data

(60) Provisional application No. 60/558,714, filed on Mar. 31, 2004.

(51) Int. Cl.
*H04Q 7/00* (2006.01)
*H04Q 7/24* (2006.01)
*H04Q 7/20* (2006.01)

(52) U.S. Cl. .............. 370/331; 370/338; 455/436; 455/431

(58) Field of Classification Search .......... 370/331, 370/338; 455/436, 431
See application file for complete search history.

(56) References Cited

U.S. PATENT DOCUMENTS

| 5,533,026 | A |   | 7/1996 | Ahmadi et al. |   |
|---|---|---|---|---|---|
| 2002/0031107 | A1 | * | 3/2002 | Li et al. | 370/338 |
| 2003/0039240 | A1 | * | 2/2003 | Sutanto | 370/352 |

FOREIGN PATENT DOCUMENTS

WO    WO-03/096555 A2    11/2003

OTHER PUBLICATIONS

Cohen et al.; "IP Addressing and Routing in a Local Wireless Network", One World Through Communications, Florence, May 4-8, 1992, Proceedings of the Conference on Computer Communications (INFOCOM), New York, IEEE, US, vol. 2, Conf. 11, Jan. 1992, pp. 626-632, XP000300088, ISBN: 0-7803-0602-3.
Perkins et al., "IP Mobility Support", IETF Standard, Internet Engineering Task Force, IETF, CH, Oct. 1996, pp. 1-80, XP015007786, ISSN: 0000-0003.

* cited by examiner

*Primary Examiner*—Barry Taylor
(74) *Attorney, Agent, or Firm*—Robert R. Richardson, P.S.

(57) ABSTRACT

Propagation of a mobile platform's public IP address though Internet service providers is monitored as the mobile platform is handed-off from a first ground station to a second ground station. The mobile platform's public IP address is removed from the first ground station. The first ground station is checked to determine whether the mobile platform's public IP address is no longer present there. After a predetermined period, the second ground station is checked to determine whether the mobile platform's public IP address is no longer present at the first ground station. The mobile platform's public IP address is added to the second ground station. The second ground station is checked to determine whether the mobile platform's public IP address is now present there. After a predetermined period, the first ground station is checked to determine whether the mobile platform's public IP address is now present at the second ground station.

24 Claims, 8 Drawing Sheets

ROUTE SERVER MONITOR

CROSS-REFERENCE TO RELATED APPLICATIONS

This Application is a Non-Prov of Prov (35 USC 119(e)) application 60/558,714 filed on Mar. 31, 2004.

FIELD OF THE INVENTION

This invention relates generally to mobile network communications and, more specifically, to monitoring of communications routing within mobile communication networks.

BACKGROUND OF THE INVENTION

Information is often exchanged and entertainment content is often broadcast as packetized data over communication networks. Typically, an end user accesses information or entertainment content via a user terminal such as a desktop computer, a laptop computer, a personal digital assistant (PDA), an Internet-enabled mobile phone, or the like. The user terminals may be connected to the network via wireless radiofrequency (RF) connectivity or, with the exception of a mobile phone, via a cable connection. Further, the network typically includes routers and servers for routing the data packets from content providers or other network destinations to the end user through networks, such as the Internet.

Organizations and enterprises are becoming more and more dependent upon such networks for day-to-day operations. Further, a significant number of organizations, such as Connexion by Boeing™, are in the business of providing such networks for end users. Because of the importance of maintaining network operations to organizations and to end-users/customers, network management tools have been developed to monitor network operations and status.

Increasingly, communications networks may be provided as mobile communications networks. In a mobile communications network, a node may be a mobile platform such as an airplane, a maritime vessel, a land vehicle, or the like. By their nature, mobile platform nodes physically move within and among coverage areas of a mobile network. To that end, the mobile platform must be handed-off in RF connectivity from one ground station to another ground station when the mobile platform moves from the RF coverage area of one ground station to an RF coverage area of the other ground station.

Moreover, the Internet protocol (IP) public IP address of the mobile platform must be able to be accessed by Internet service providers throughout the world regardless of which ground station is providing RF connectivity with the mobile platform. As the mobile platform is handed-off from RF coverage of one ground station to RF coverage area of the other ground station, the public IP address for the mobile platform is removed from the first ground station and added to the second ground station. The public IP address for the mobile platform propagates to all Internet Service Providers (ISPs).

When the public IP address fully propagates to all the ISPs, the ISPs know that the mobile platform's IP address is at the other ground station. However, if the public IP address at the other ground station does not fully propagate throughout the Internet by the time the RF handoff is complete, IP packets routed by ISPs may not reach the mobile platform even though the mobile. platform has established RF connectivity in the RF coverage area of the other ground station. This may result in a service disruption—again, even though the mobile platform has established RF communication with the other ground station.

It would be desirable to monitor propagation of the mobile platform's public IP address through ISPs. However, there is an unmet need in the art for a tool for monitoring propagation of a mobile platform's public IP address as the mobile platform is handed-off from one ground station to another ground station.

SUMMARY OF THE INVENTION

Embodiments of the present invention provide a method, system, and computer program product for monitoring propagation through the Internet of a mobile platform's public Internet protocol (IP) address. Advantageously, embodiments of the present invention provide a tool for monitoring propagation through Internet Service Providers (ISPs) of a mobile platform's public IP address as the mobile platform is handed-off in radiofrequency (RF) communication from one ground station to another ground station. As a result, a mobile communication network provider is able to take actions to mitigate possibilities of disruptions to service.

According to an embodiment of the present invention, a route server monitor monitors propagation of a mobile platform's public IP address as the mobile platform is handed-off in RF communication from a first ground station to a second ground station within a mobile communications system. When the mobile platform is handed-off from the first ground station to the second ground station, a route server causes the mobile platform's public IP address to be removed from the first ground station. The route server monitor checks the first ground station to determine whether the mobile platform's public IP address is no longer present at the first ground station. After a predetermined period (such as around 30 seconds), the route server monitor checks the second ground station and all other ground stations (other than the first ground station) that may be present within the mobile communications system to determine whether the mobile platform's public IP address is no longer present at the first ground station. Advantageously, because the mobile platform's public IP address propagates through the Internet via ISPs to the other ground stations, checking the other ground stations provides a check of whether the removal of the mobile platform's public IP address from the first ground station has propagated through the Internet via the ISPs.

The route server monitor similarly monitors addition of the mobile platform's public IP address to the second ground station. When the mobile platform is handed-off from the first ground station to the second ground station, the route server adds the mobile platform's public IP address to the second ground station. The route server monitor checks the second ground station to determine whether the mobile platform's public IP address is now present at the second ground station. After a predetermined period (such as around 30 seconds), the route server monitor checks the first ground station and all other ground stations (other than the second ground station) that may be present within the mobile communications system to determine whether the mobile platform's public IP address is now present at the second ground station. Advantageously, because the mobile platform's public IP address propagates through the Internet via ISPs to the other ground stations, checking the other ground stations provides a check of whether the addition of the mobile platform's public IP address to the second ground station has propagated through the Internet via the ISPs.

According to an aspect of the present invention, after a predetermined time period removal of the mobile platform's public IP address from the first ground station may be checked again at the second ground station and all other ground stations (other than the first ground station) that may be present within the mobile communications system. Similarly, after the predetermined time period addition of the mobile platform's public IP address to the second ground station may be checked again at the first ground station and all other ground stations (other than the second ground station) that may be present within the mobile communications system. If the mobile platform's public IP address has not been removed or added, as the case may be, then a caution or warning may be provided as desired.

DETAILED DESCRIPTION OF THE INVENTION

Embodiments of the present invention provide a method, system, and computer program product for monitoring propagation of a mobile platform's public Internet protocol (IP) address through the Internet. Advantageously, embodiments of the present invention provide a tool for monitoring propagation of a mobile platform's public IP address through Internet Service Providers (ISPs) as the mobile platform is handed-off in radiofrequency (RF) communication from one ground station to another ground station within a mobile communications system. As a result, a mobile communication network provider is able to take actions to mitigate possibilities of disruptions to service.

Figure 1:
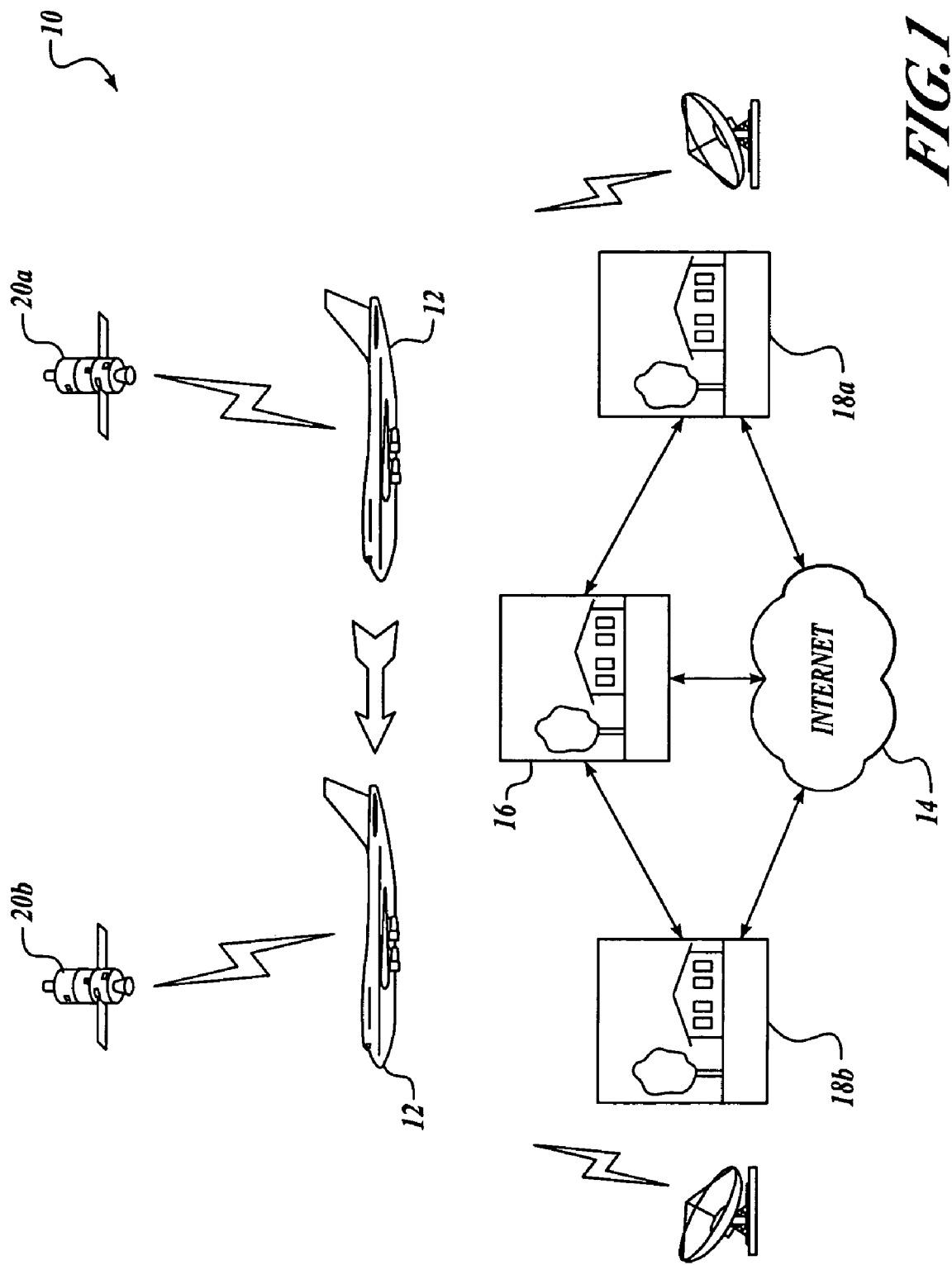
FIG. 1 is a block diagram of a an exemplary mobile communications network that is a host environment for embodiments of the present invention.

Embodiments of the present invention advantageously may be employed in any mobile communications network that routes packets to mobile platforms that are handed-off in RF communications from one ground station to another ground station. Given by way of non-nonlimiting example and referring now to FIG. 1, embodiments of the present invention may be used in mobile communications networks such as a mobile communications network 10, in which a mobile platform 12 is shown by way of non-limiting example as an aircraft. A mobile network control facility 16 provides command and control over routing of packets between the mobile platform 12 and destinations on the Internet 14. A public IP address for the mobile platform 12 is assigned to a first ground station 18a. The public IP address propagates throughout the Internet 14 to all Internet service providers (ISPs) (not shown). As the mobile platform 12 is handed-off from RF coverage of the first ground station 18a to RF coverage of a second ground station 18b, the public IP address for the mobile platform 12 is removed from the first ground station 18a and added to the second ground station 18b. The public IP address for the mobile platform 12 propagates again to all the ISPs. One non-nonlimiting example of a network like the mobile communications network 10 is Connexion by Boeing. However, it will be appreciated that the mobile communications network 10 is not limited to any particular implementation. Further, it will be appreciated that the mobile platform 12 may be any vehicle such as a land vehicle, a maritime or naval vessel, or the like. While the mobile platform 12 is illustrated in FIG. 1 as an airplane, it will be appreciated that the mobile platform 12 is not intended to be limited whatsoever.

As discussed above, the public IP address of the mobile platform 12 must be able to be accessed by Internet service providers throughout the world regardless of which ground station is providing RF connectivity with the mobile platform 12. An exemplary system for routing data packets to and from the mobile platform 12 is discussed below by way of non-limiting example. It is this type of system for routing data packets to and from the mobile platform 12 that is monitored by embodiments of the present invention.

Figure 2:
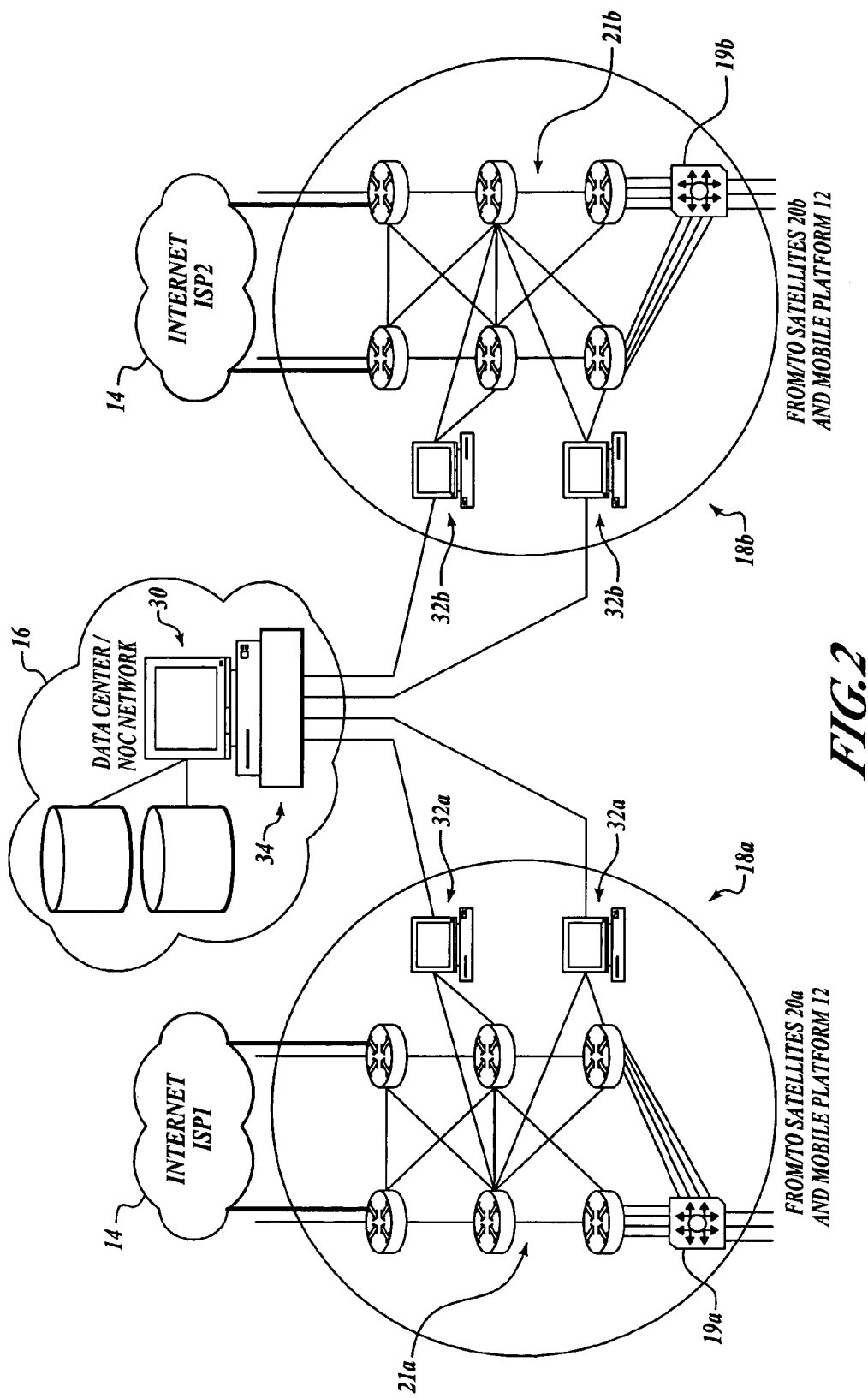
FIG. 2 is a block diagram of an exemplary system according to an embodiment of the present invention.

Referring now to FIG. 2, a route server controller 30 suitably is physically located at the mobile network control facility 16 and provides command and control over routing of packets by route servers 32a and 32b between the mobile platform 12 and destinations on the Internet 14. A public IP address, such as for example and without limitation any address in a range between 216.65.245.0 through 216.65.245.255, for the mobile platform 12 is assigned to a first ground station 18a. Once assigned, the public IP address propagates throughout the Internet 14 to all ISPs (not shown) in a known manner. As the mobile platform 12 is handed-off from RF coverage of the first ground station 18a to RF coverage of the second ground station 18b, the route server controller 30 causes the route servers 32a to remove the public IP address for the mobile platform 12 from the first ground station 18a and causes the route servers 32b to add the public IP address for the mobile platform 12 to the second ground station 18b. Once assigned to the second ground station 18b, the public IP address for the mobile platform 12 propagates again to all the ISPs in a known manner. When the public IP address fully propagates to all the ISPs, the ISPs know that the mobile platform's IP address is at the second ground station 18b. The ground stations 18a and 18b are in RF communication with the satellites 20a and 20b, respectively, via transmitter/receivers 19a and 19b, respectively. The ground stations 18a and 18b include routers 21a and 21b, respectively, for connecting to the Internet 14.

Advantageously and according to embodiments of the present invention, a route server monitor 34 monitors propagation of a mobile platform's public IP address as the mobile platform 12 is handed-off from the first ground station 18a to the second ground station 18b. The route server controller 30 and the route server monitor 34 suitably are in packet communications via TCP connections over a private network. The route server monitor 34 suitably is any computer having any suitable processor and running any suitable communication software resident thereon.

Figure 3A:
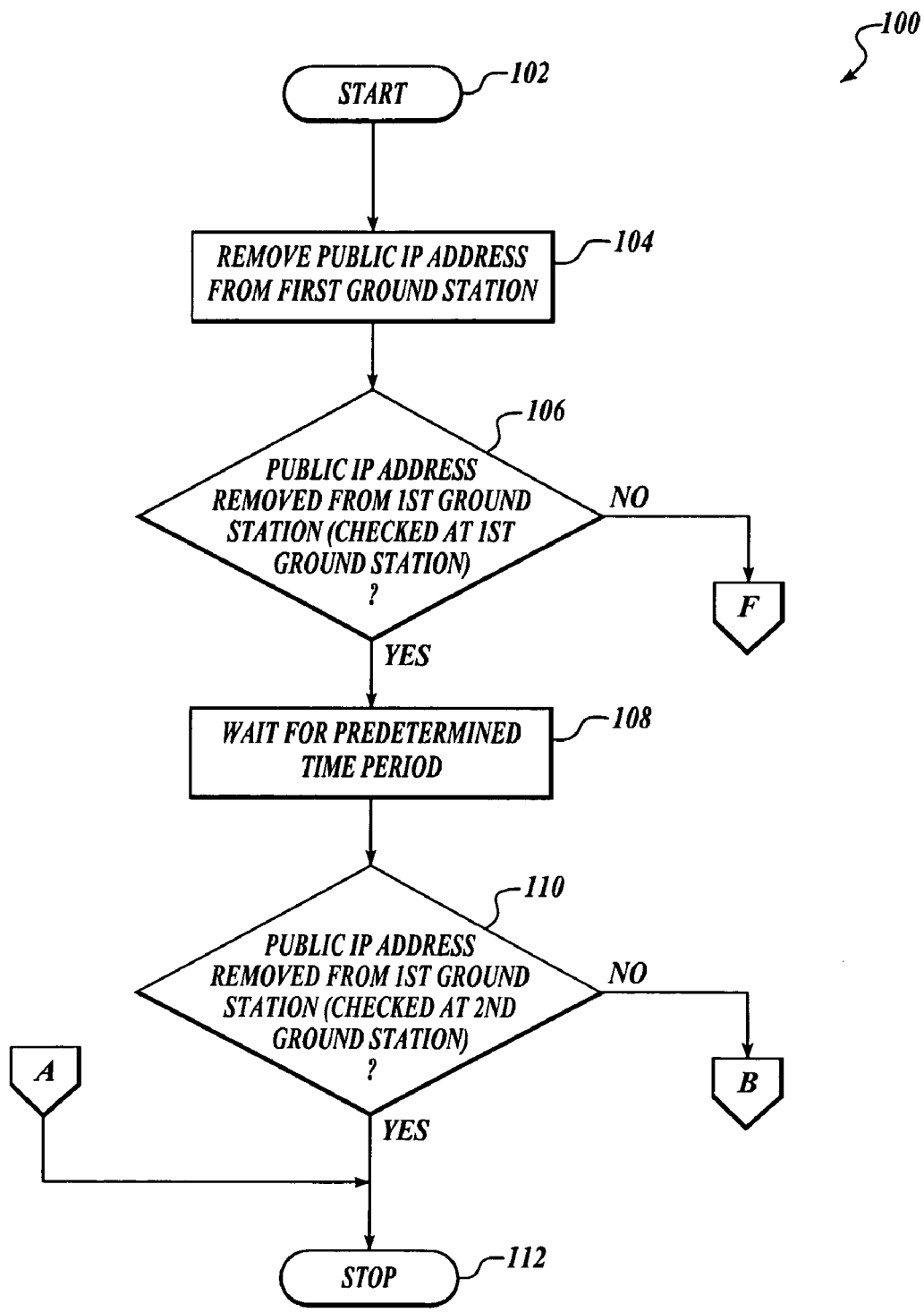
FIGS. 3A-3D are flow charts of an exemplary routine for monitoring propagation through the Internet of a mobile platform's public IP address according to an embodiment of the present invention.
Figure 3B:
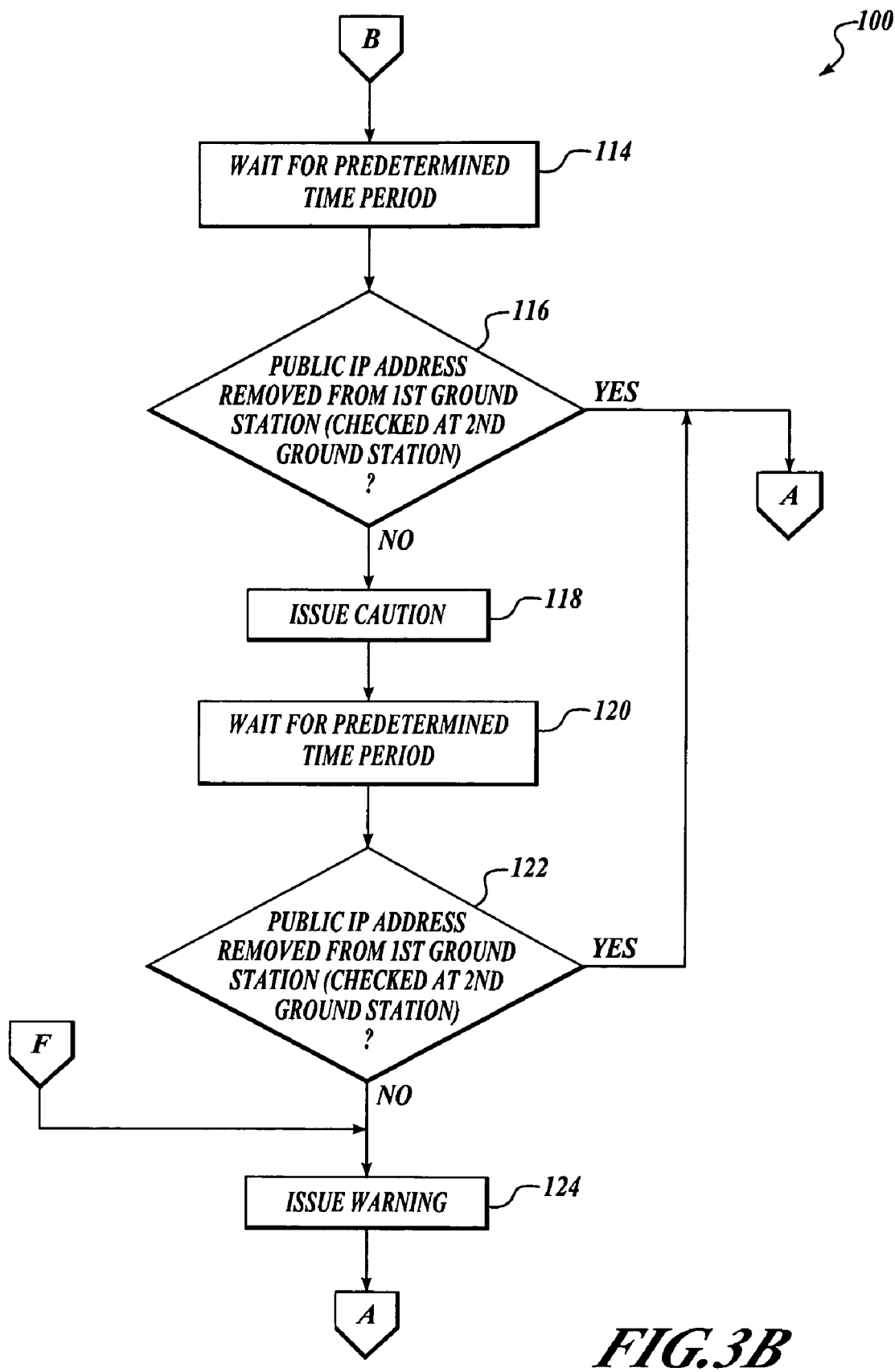

According to an embodiment of the present invention, the route server monitor 34 monitors propagation through ISPs of removal of the mobile platform's public IP address from the first ground station 18a as well as addition of the mobile platform's public IP address to the second ground station 18b. To that end and referring additionally now to FIGS. 3A and 3B, a routine 100 is performed for monitoring propagation through ISPs of removal of the mobile platform's public IP address from the first ground station 18a. The routine 100 starts at a block 102.

When the mobile platform 12 is handed-off from the first ground station 18a to the second ground station 18b, at a block 104 the route server controller 30 causes the route servers 32a to remove the mobile platform's public IP address from the first ground station 18a via suitable commands issued over the private network. Over the private network, at a decision block 106 the route server monitor 34 checks the first ground station 18a to determine whether the mobile platform's public IP address is no longer present at the first ground station 18a. If a determination is made at the decision block 106 that the mobile platform's public IP address is not removed from the first ground station 18a, then the routine 100 proceeds to a block 124 at which a suitable warning is issued. Having been alerted by any issued warnings, personnel within the network control facility 16 can take appropriate action as desired in order to mitigate possibilities of a disruption to service. After a suitable warning is issued at the block 124, the routine 100 then ends at a block 112.

If a determination is made at the decision block 106 that the mobile platform's public IP address has been removed from the first ground station 18a, then the routine 100 proceeds to a block 108 at which a predetermined time period is waited. After the predetermined time period (such as around 30 seconds), at a decision block 110 over the private network the route server monitor 34 checks the second ground station 18b (and all other ground stations that may be present within the system 10) to determine whether the mobile platform's public IP address is no longer present at the first ground station 18a. Advantageously, because the mobile platform's public IP address propagates through the Internet 14 via ISPs to the other ground stations, according to the present invention checking the other ground stations provides a check of whether the removal of the mobile platform's public IP address from the first ground station 18a has propagated through the Internet via the ISPs. If at the decision block 110 the mobile platform's public IP address is determined to be removed from the first ground station 18a, then the routine 100 ends at the block 112.

If propagation through the ISPs takes too long, the service can be impacted. For example, users onboard the mobile platform may access a company's network through a virtual private network (VPN) connection. As is known, VPN connections can be subject to timeout disconnects. To that end, according to an embodiment of the present invention, if a determination is made at the decision block 110 that the mobile platform's public IP address is not removed from the first ground station 18a. then the routine 100 proceeds to a block 114 at which a predetermined period, such as around 30 seconds or so, is waited again. At a decision block 116, the route server monitor 34 rechecks the second ground station 18b (and all other ground stations that may be present within the system 10) after the predetermined time period to determine if the mobile platform's public IP address is still present at the first ground station 18a. In one embodiment, the recheck at the decision block 116 may be performed after an additional 30 seconds or so. If a determination is made at the decision block 116 that the mobile platform's public IP address has been removed from the first ground station 18a. then the routine 100 proceeds to the block 112 and ends. If after the additional time period waited at the block 114 the mobile platform's public IP address is determined at the decision block 116 still to be present at the first ground station 18a, then at a block 118 the route server monitor 34 may issue a caution to this effect.

In one embodiment of the present invention, at a block 120 the route server monitor 34 waits for another predetermined time period, such as around an additional 15 seconds or so, and then at a decision block 122 checks the second ground station 18b (and all other ground stations that may be present within the system 10) again to determine whether the mobile platform's public IP address is still present at the first ground station 18a. In this case, this recheck will have happened at around 75 seconds or so. If a determination is made at the decision block 122 that the mobile platform's public IP address has been removed from the first ground station 18a, then the routine 100 proceeds to the block 112 and ends. If the public IP address of the mobile platform 12 is still present at the first ground station 18a after this additional recheck at the decision block 122, then at the block 124 the route server monitor 34 may issue a warning. Having been alerted by any issued cautions or warnings as described above, personnel within the network control facility 16 can take appropriate action as desired in order to mitigate possibilities of a disruption to service. The routine 100 proceeds to the block 112 and ends.

Figure 3C:
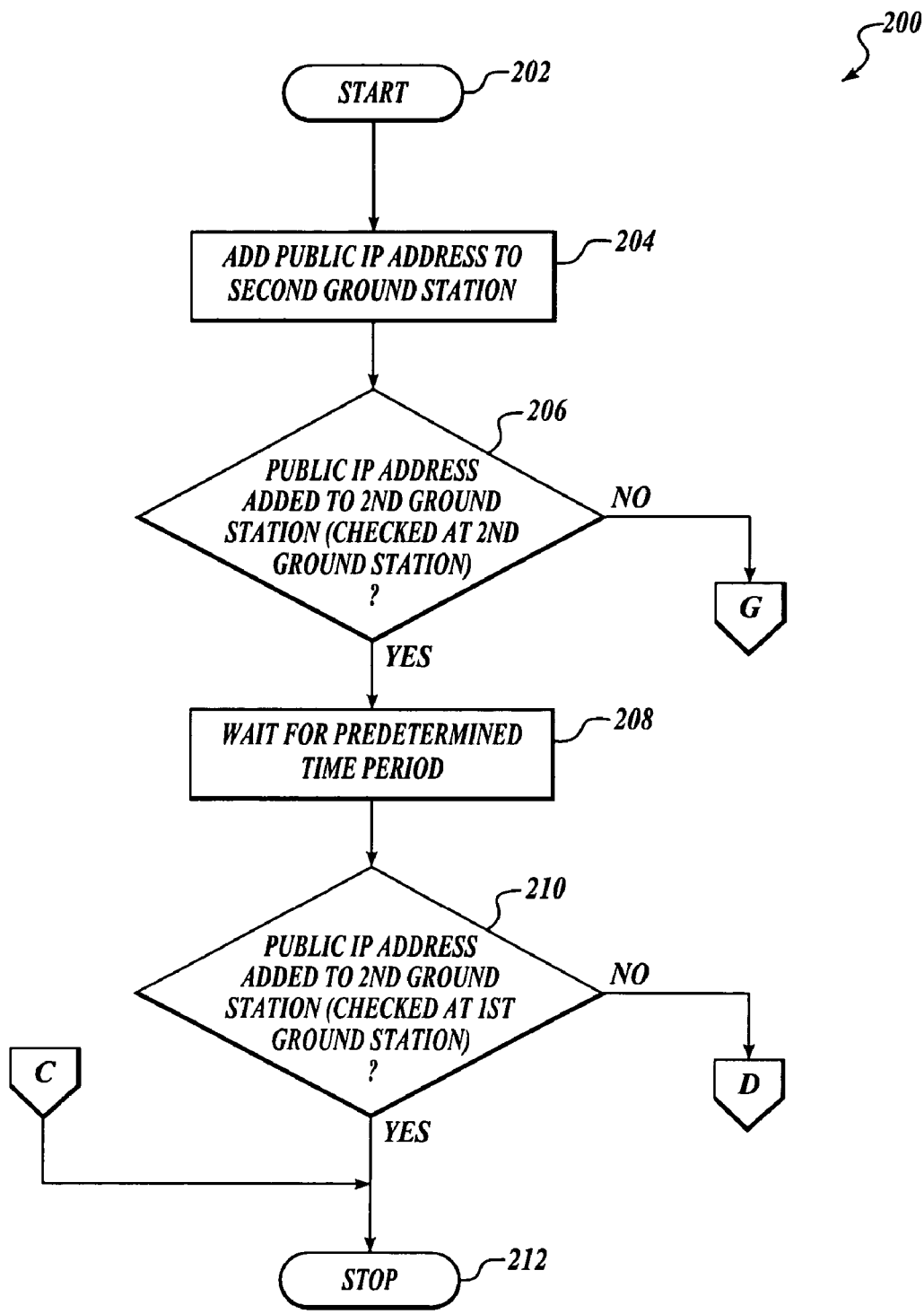
Figure 3D:
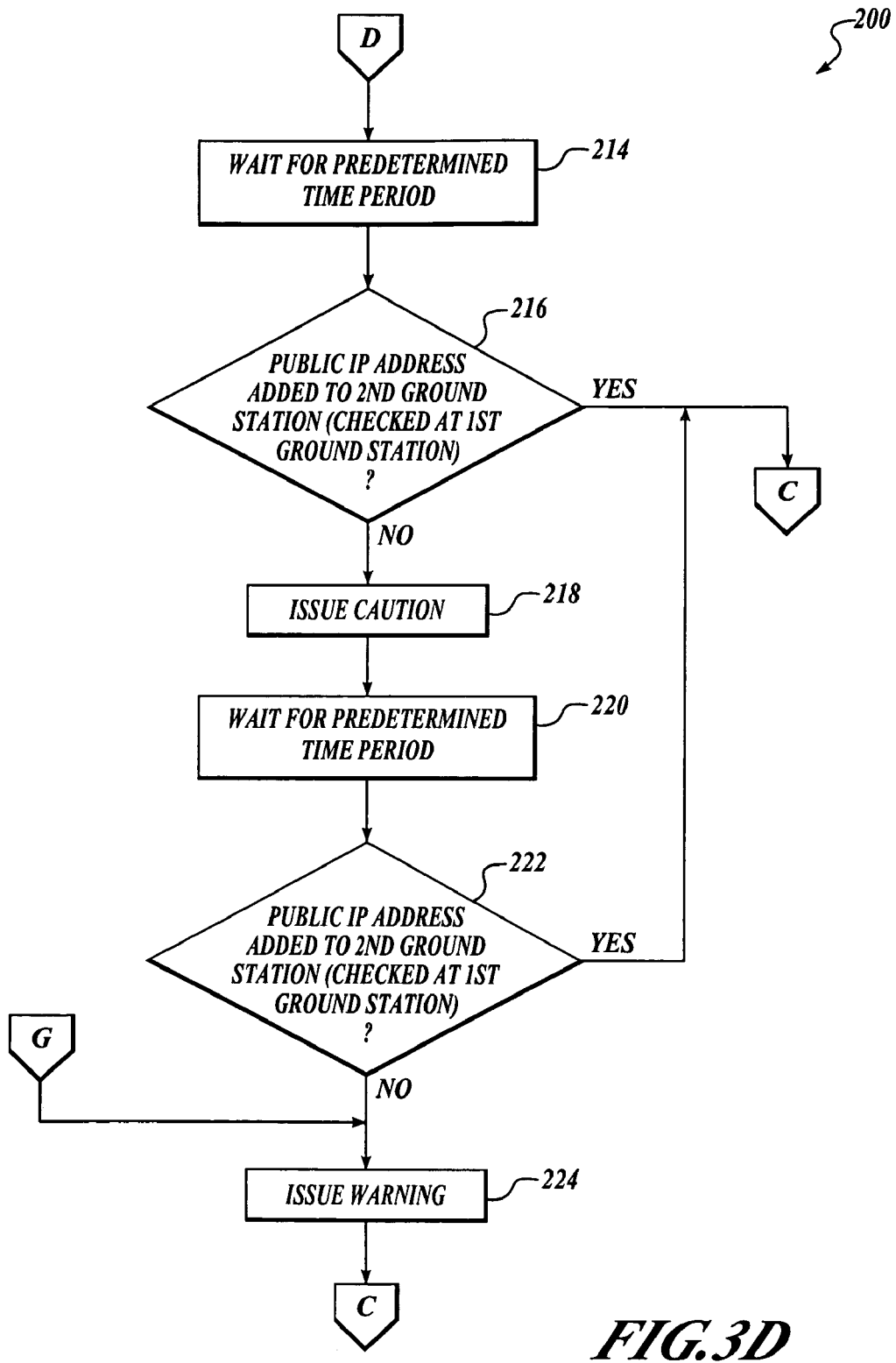

According to an embodiment of the present invention, the route server monitor 34 similarly monitors addition of the mobile platform's public IP address to the second ground station 18b. Referring additionally now to FIGS. 3C and 3D, a routine 200 is performed for monitoring propagation through ISPs of addition of the mobile platform's public IP address to the second ground station 18b. The routine 200 starts at a block 202 after the routine 100 has been performed to verify removal from the first ground station 18a of the mobile platform's public IP address (as part of the process of the mobile platform 12 being handed-off from the first ground station 18a to the second ground station 18b).

At a block 204 the route server controller 30 causes the route servers 32a to add the mobile platform's public IP address to the second ground station 18b via suitable commands issued over the private network. Over the private network, at a decision block 206 the route server monitor 34 checks the second ground station 18b to determine whether the mobile platform's public IP address is present at the second ground station 18b. If a determination is made at the decision block 206 that the mobile platform's public IP address is not added to the second ground station 18b, then the routine 200 proceeds to a block 224 at which a suitable warning is issued. Having been alerted by any issued warnings, personnel within the network control facility 16 can take appropriate action as desired in order to mitigate possibilities of a disruption to service. After a suitable warning is issued at the block 224, the routine 200 then ends at a block 212.

If a determination is made at the decision block 206 that the mobile platform's public IP address has been added to the second ground station 18b, then the routine 200 proceeds to a block 208 at which a predetermined time period is waited. After the predetermined time period (such as around 30 seconds), at a decision block 220 over the private network the route server monitor 34 checks the first ground station 18a (and all other ground stations that may be present within the system 20) to determine whether the mobile platform's public IP address is present at the second ground station 18b. Advantageously, because the mobile platform's public IP address propagates through the Internet 14 via ISPs to the other ground stations, according to the present invention checking the other ground stations provides a check of whether the addition of the mobile platform's public IP address to the second ground station 18b has propagated through the Internet via the ISPs. If at the decision block 210 the mobile platform's public IP address is determined to be added to the second ground station 18*b*, then the routine 200 ends at the block 212.

As discussed above, if propagation through the ISPs takes too long, the service can be impacted. To that end, according to an embodiment of the present invention, if a determination is made at the decision block 210 that the mobile platform's public IP address is not added to the second ground station 18*b*, then the routine 200 proceeds to a block 214 at which a predetermined period, such as around 30 seconds or so, is waited again. At a decision block 216, the route server monitor 34 rechecks the first ground station 18*a* (and all other ground stations that may be present within the system 10) after the predetermined time period to determine if the mobile platform's public IP address is added to the second ground station 18*b*. In one embodiment, the recheck at the decision block 216 may be performed after an additional 30 seconds or so. If a determination is made at the decision block 216 that the mobile platform's public IP address has been added to the second ground station 18*b*, then the routine 200 proceeds to the block 212 and ends. If after the additional time period waited at the block 214 the mobile platform's public IP address is determined at the decision block 216 still not to be added to the second ground station 18*b*, then at a block 218 the route server monitor 34 may issue a caution to this effect.

In one embodiment of the present invention, at a block 220 the route server monitor 34 waits for another predetermined time period, such as around an additional 15 seconds or so, and then at a decision block 222 checks the first ground station 18*a* (and all other ground stations that may be present within the system 10) again to determine whether the mobile platform's public IP address is added to the second ground station 18*b*. In this case, this recheck will have happened at around 75 seconds or so. If a determination is made at the decision block 222 that the mobile platform's public IP address has been added to the second ground station 18*b*, then the routine 200 proceeds to the block 212 and ends. If the public IP address of the mobile platform 12 is still not added to the second ground station 18*b* after this additional recheck at the decision block 222, then at the block 224 the route server monitor 34 may issue a warning. Having been alerted by any issued cautions or warnings as described above, personnel within the network control facility 16 can take appropriate action as desired in order to mitigate possibilities of a disruption to service. The routine 200 proceeds to the block 212 and ends.

It will be appreciated that the route server monitor 34 may cause the routines 100 and 200 to be performed responsive to instructions or commands or the like that are communicated to the route server monitor 34. For example, the route server monitor 34 may cause the routines 100 and 200 to be performed responsive to a computer program, such as computer software, that may be loaded into random access memory (RAM) of the route server monitor 34 and executed by a processor of the route server monitor 34. The computer software suitably is embodied as a computer software program product that is compiled as executable computer software program code and stored on any acceptable storage media, such as a compact disc, a floppy disc, or the like.

Figure 4:
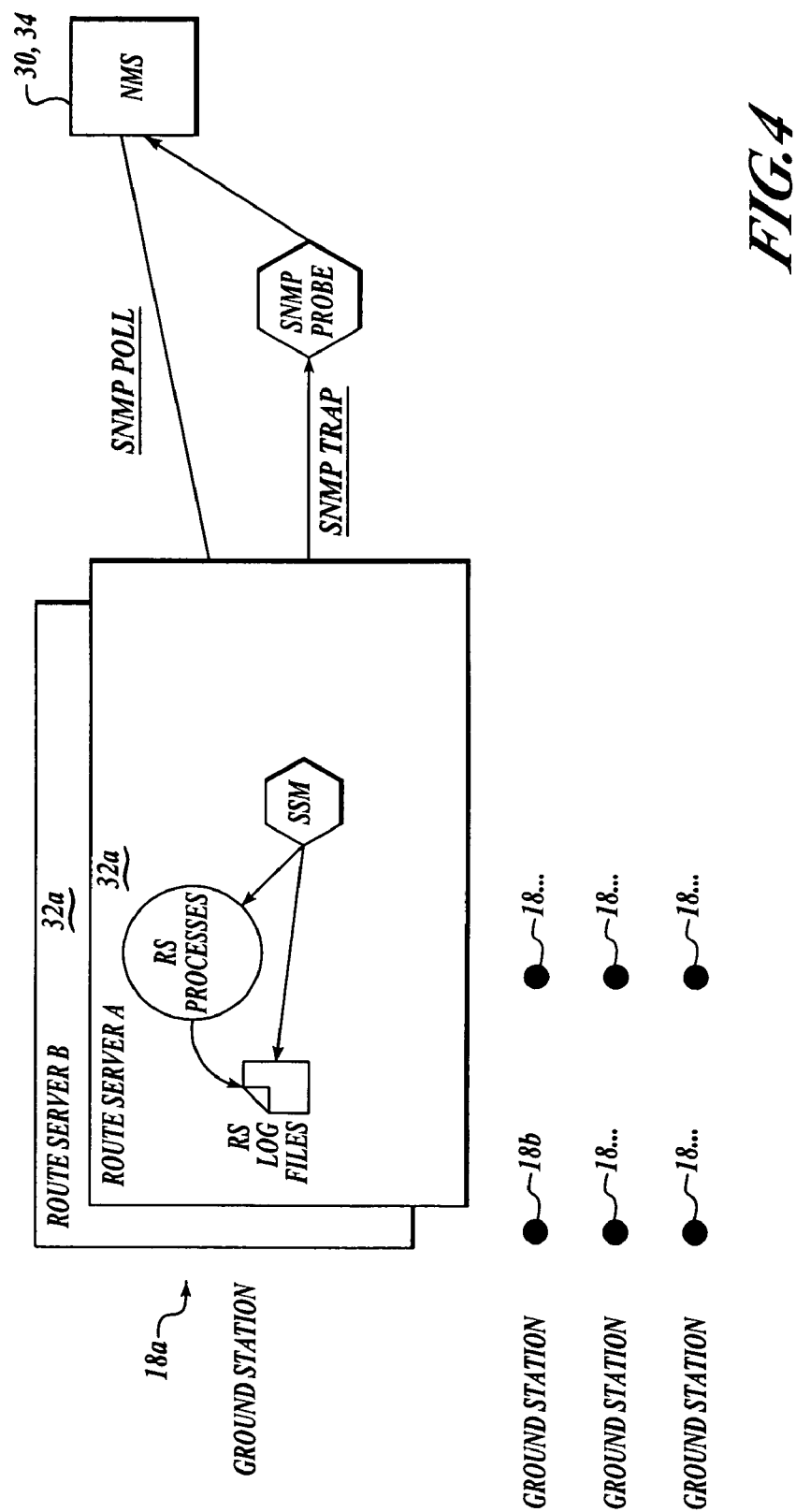
FIG. 4 illustrates an exemplary process performed by the system of FIG. 2.

Referring now to FIG. 4, some of the processes described above may be performed, by way of non-limiting example, as standard network management protocol (SNMP) polls and message traps and log-monitoring routines. For example, the blocks 104 (FIG. 3A) and 204 (FIG. 3C) suitably detect the transactions (that is adding and removing IP addresses) via log monitoring routines and/or SNMP message traps. Also, the blocks 106 and 110 (FIG. 3A), 116 and 122 (FIG. 3B), 206 and 210 (FIG. 3C), and 216 and 222 (FIG. 3D) suitably use SNMP polls to verify whether the propagation is properly executed. As a further example, the blocks 118 and 124 (FIG. 3B) and 218 and 224 (FIG. 3D) suitably use SNMP message traps to issue the caution or warning.

Figure 5:
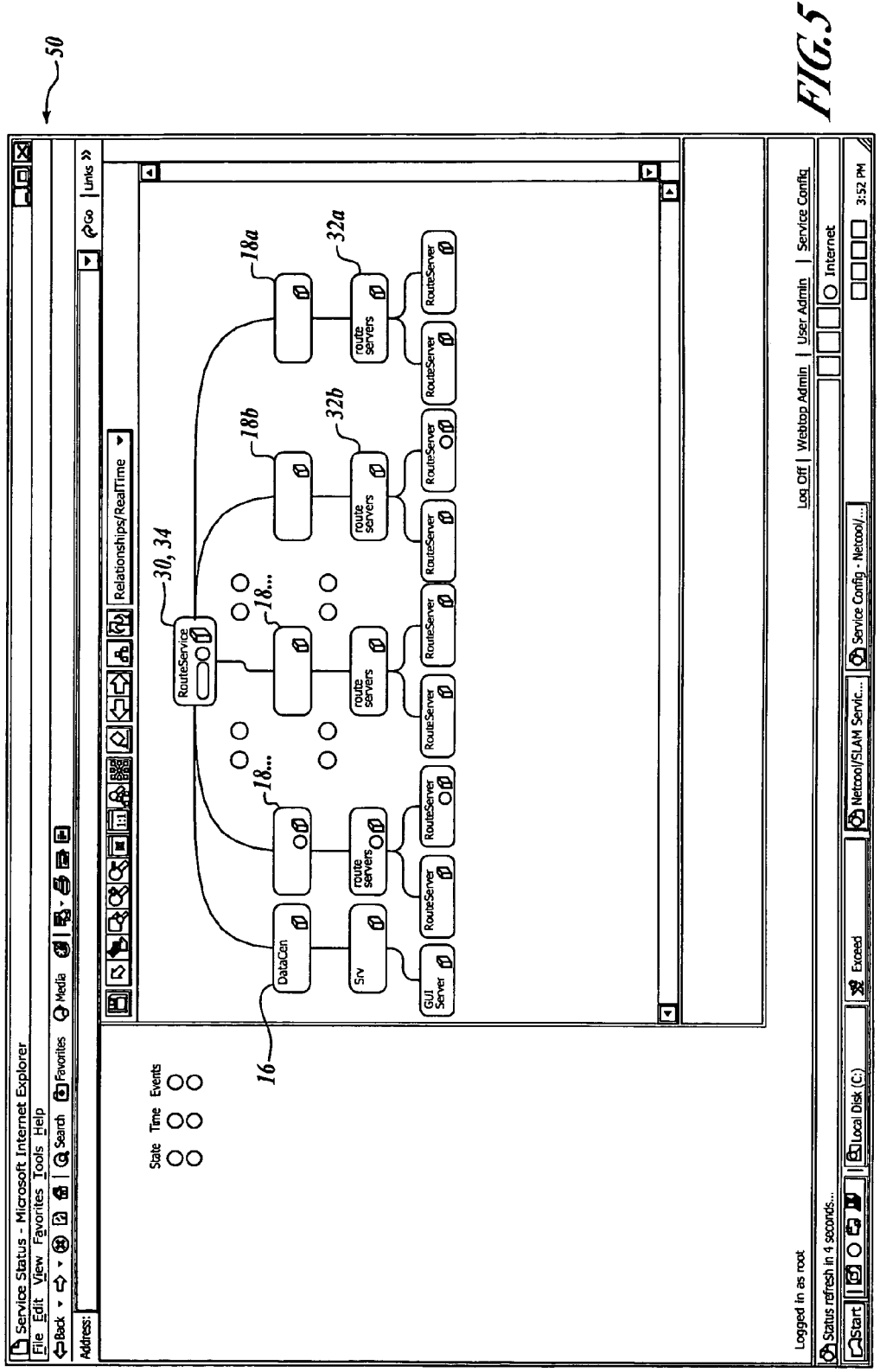
FIG. 5 is a screen shot of an exemplary implementation of the process of FIG. 4.

Referring now to FIG. 5, an exemplary screen 50 graphically depicts route service within the network 10. Each major component (such as the network control facility 16, the first and second ground stations 18*a* and 18*b*, and the route servers 32*a* and 32*b*) and services (such as the route server controller 30 and the route server monitor 34) within the network 10 appears as an icon. The icon may include identifying information as desired. Advantageously, the icon may employ a color code or the like to indicate a caution or warning associated with route service. For example, a first color code could be used, if desired, to indicate a caution associated with expiration of a first predetermined time period as discussed above. Given by way of non-limiting example, a yellow color code could be used to indicate a caution. A second color code could be used, if desired, to indicate a warning associated with expiration of a second predetermined time period as discussed above. Given by way of non-limiting example, a red color code could be used to indicate a warning. Aural indications of a caution or warning condition may be provided via annunciators, buzzers, or the like (not shown), if desired. However, it will be appreciated that any code or indication whatsoever may be used as desired to indicate a caution or warning condition.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for monitoring propagation through the Internet of a mobile platform's public IP address as the mobile platform is handed-off from a first ground station to a second ground station in a mobile communications network, the method comprising:

after a mobile platform's public IP address has been directed to be removed from a first ground station of a mobile communications network, making a determination at the first ground station whether the mobile platform's public IP address is present at the first ground station;

after a predetermined time period, making a first determination at a second ground station of the mobile communications network whether the mobile platform's public IP address is present at the first ground station;

after the mobile platform's public IP address has been directed to be added to the second ground station, making a determination at the second ground station whether the mobile platform's public IP address is present at the second ground station;

after the predetermined time period, making a first determination at the first ground station whether the mobile platform's public IP address is present at the second ground station;

after another predetermined time period, making a second determination at the second ground station whether the mobile platform's public IP address is present at the first ground station; and issuing a caution when the second determination determines that the mobile platform's public IP address is present at the first ground station.

2. The method of claim 1, further comprising, after another predetermined time period, making a third determination at the second ground station whether the mobile platform's public IP address is present at the first ground station.

3. The method of claim 2, further comprising issuing a warning when the third determination determines that the mobile platform's public IP address is present at the first ground station.

4. The method of claim 1, further comprising, after another predetermined time period, making a second determination at the first ground station whether the mobile platform's public IP address is present at the second ground station.

5. The method of claim 4, further comprising issuing a caution when the second determination determines that the mobile platform's public IP address is not present at the second ground station.

6. The method of claim 4, further comprising, after another predetermined time period, making a third determination at the first ground station whether the mobile platform's public IP address is present at the second ground station.

7. The method of claim 6, further comprising issuing a warning when the third determination determines that the mobile platform's public IP address is not present at the second ground station.

8. The method of claim 1, wherein the predetermined time period is around 30 seconds.

9. A computer readable code encoded on a computer readable medium for monitoring propagation through the Internet of a mobile platform's public IP address as the mobile platform is handed-off from a first ground station to a second ground station in a mobile communications network, the computer readable code comprising:
    first computer program code means for making a determination at a first ground station of a mobile communications network whether a mobile platform's public IP address is present at the first ground station after the mobile platform's public IP address has been directed to be removed from the first ground station;
    second computer program code means for making a first determination at a second ground station of the mobile communications network whether the mobile platform's public IP address is present at the first ground station after a predetermined time period;
    third computer program code means for making a determination at the second ground station whether the mobile platform's public IP address is present at the second ground station after the mobile platform's public IP address has been directed to be added to the second ground station;
    fourth computer program code means for making a first determination at the first ground station whether the mobile platform's public IP address is present at the second ground station after the predetermined time period;
    fifth computer program code means for making, after another predetermined time period, a second determination at the second ground station whether the mobile platform's public IP address is present at the first ground station; and
    sixth computer program code means for issuing a caution when the fifth computer program code means determines that the mobile platform's public IP address is present at the first around station.

10. The computer readable code of claim 9, further comprising seventh computer program code means for making, after another predetermined time period, a third determination at the second ground station whether the mobile platform's public IP address is present at the first ground station.

11. The computer readable code of claim 10, further comprising eighth computer program code means for issuing a warning when the seventh computer program code means determines that the mobile platform's public IP address is present at the first ground station.

12. The computer readable code of claim 9, further comprising ninth computer program code means for making, after another predetermined time period, a second determination at the first ground station whether the mobile platform's public IP address is present at the second ground station.

13. The computer readable code of claim 12, further comprising tenth computer program code means for issuing a caution when the ninth computer program code means determines that the mobile platform's public IP address is not present at the second ground station.

14. The computer readable code of claim 12, further comprising eleventh computer program code means for making, after another predetermined time period, a third determination at the first ground station whether the mobile platform's public IP address is present at the second ground station.

15. The computer readable code of claim 14, further comprising twelfth computer program code means for issuing a warning when the eleventh computer program code means determines that the mobile platform's public IP address is not present at the second ground station.

16. The computer readable code of claim 9, wherein the predetermined time period is around 30 seconds.

17. A system for monitoring propagation through the Internet of a mobile platform's public IP address as the mobile platform is handed-off from a first ground station to a second ground station in a mobile communications network, the system comprising:
    a communications network configured to permit packet communications with at least first and second ground stations of a mobile communications network without accessing an Internet service provider; and
    a processor in packet communications with the communications network, the processor including:
        a first component configured to make a determination at the first ground station whether a mobile platform's public IP address is present at the first ground station after the mobile platform's public IP address has been directed to be removed from the first ground station;
        a second component configured to make a first determination at the second ground station whether the mobile platform's public IP address is present at the first ground station after a predetermined time period;
        a third component configured to make a determination at the second ground station whether the mobile platform's public IP address is present at the second ground station after the mobile platform's public IP address has been directed to be added to the second ground station;
        a fourth component configured to make a first determination at the first ground station whether the mobile platform's public IP address is present at the second ground station after the predetermined time period;

a fifth component configured to make, after another predetermined time period, a second determination at the second ground station whether the mobile platform's public IP address is present at the first around station; and a sixth component configured to issue a caution when the fifth computer program code means determines that the mobile platform's public IP address is present at the first around station.

18. The system of claim 17, wherein the processor further includes a seventh component configured to make, after another predetermined time period, a third determination at the second ground station whether the mobile platform's public IP address is present at the first ground station.

19. The system of claim 18, wherein the processor further includes an eighth component configured to issue a warning when the seventh computer program code means determines that the mobile platform's public IP address is present at the first ground station.

20. The system of claim 17, wherein the processor further includes a ninth component configured to make, after another predetermined time period, a second determination at the first ground station whether the mobile platform's public IP address is present at the second ground station.

21. The system of claim 20, wherein the processor further includes a tenth component configured to issue a caution when the ninth computer program code means determines that the mobile platform's public IP address is not present at the second ground station.

22. The system of claim 20, wherein the processor further includes an eleventh component configured to make, after another predetermined time period, a third determination at the first ground station whether the mobile platform's public IP address is present at the second ground station.

23. The system of claim 22, wherein the processor further includes a twelfth component configured to issue a warning when the eleventh computer program code means determines that the mobile platform's public IP address is not present at the second ground station.

24. The system of claim 17, wherein the predetermined time period is around 30 seconds.

* * * * *